(12) United States Patent
Peterson et al.

(10) Patent No.: US 10,588,000 B2
(45) Date of Patent: Mar. 10, 2020

(54) DETERMINATION OF DEVICE AT WHICH TO PRESENT AUDIO OF TELEPHONIC COMMUNICATION

(71) Applicant: Lenovo (Singapore) Pte. Ltd., New Tech Park (SG)

(72) Inventors: Nathan J. Peterson, Durham, NC (US); Russell Speight VanBlon, Raleigh, NC (US); John Carl Mese, Cary, NC (US); Arnold S. Weksler, Raleigh, NC (US); Rod D. Waltermann, Rougemont, NC (US)

(73) Assignee: Lenovo (Singapore) Pte. Ltd., Singapore (SG)

(*) Notice: Subject to any disclaimer, the term of this patent is extended or adjusted under 35 U.S.C. 154(b) by 293 days.

(21) Appl. No.: 14/745,077

(22) Filed: Jun. 19, 2015

(65) Prior Publication Data
US 2016/0373884 A1 Dec. 22, 2016

(51) Int. Cl.
| | |
|---|---|
| H04M 3/00 | (2006.01) |
| H04W 4/80 | (2018.01) |
| H04M 1/725 | (2006.01) |
| G06F 3/16 | (2006.01) |
| H04M 1/60 | (2006.01) |

(52) U.S. Cl.
CPC ............ H04W 4/80 (2018.02); G06F 3/165 (2013.01); H04M 1/7253 (2013.01); H04M 1/6066 (2013.01); H04M 1/72569 (2013.01)

(58) Field of Classification Search
CPC ... G08C 17/02; H04M 2250/02; H04W 88/02
See application file for complete search history.

(56) References Cited

U.S. PATENT DOCUMENTS

| | | | | |
|---|---|---|---|---|
| 7,860,458 | B2* | 12/2010 | Mabuchi | H04M 1/6066 381/74 |
| 9,167,086 | B1* | 10/2015 | Gilor | H04M 3/42221 |
| 9,326,114 | B2 | 4/2016 | Lazaridis et al. | |
| 9,344,798 | B2 | 5/2016 | Goldman | |
| 9,445,391 | B2* | 9/2016 | Carlsson | G08G 1/0112 |
| 2007/0287386 | A1* | 12/2007 | Agrawal | H04W 4/029 455/67.11 |
| 2008/0039072 | A1 | 2/2008 | Bloebaum | |
| 2010/0054493 | A1 | 3/2010 | Lin et al. | |
| 2010/0159833 | A1 | 6/2010 | Lewis et al. | |

(Continued)

FOREIGN PATENT DOCUMENTS

| | | |
|---|---|---|
| CN | 103167123 A | 6/2013 |
| CN | 103188395 A | 7/2013 |

(Continued)

Primary Examiner — Shantell L Heiber
(74) Attorney, Agent, or Firm — John M. Rogitz; John L. Rogitz

(57) ABSTRACT

In one aspect, a first device includes a processor, a Bluetooth transceiver accessible to the processor, and storage accessible to the processor. The storage bears instructions executable by the processor to, based on at least one signal received at the Bluetooth transceiver, determine a distance from the first device to a second device different from the first device. The instructions are also executable to, based on the distance, execute at least one function at the first device associated with a telephonic communication.

20 Claims, 5 Drawing Sheets

(56) References Cited

U.S. PATENT DOCUMENTS

| | | | |
|---|---|---|---|
| 2011/0092161 A1* | 4/2011 | Dotan | G08B 21/0225 455/41.3 |
| 2012/0020487 A1* | 1/2012 | Fried | H03G 3/301 381/58 |
| 2012/0115464 A1* | 5/2012 | Jang | G01S 5/0205 455/426.1 |
| 2013/0090106 A1* | 4/2013 | Mathews | H04W 4/06 455/418 |
| 2013/0157573 A1* | 6/2013 | Aldaz | H04W 4/008 455/41.2 |
| 2014/0155033 A1 | 6/2014 | Lazaridus et al. | |
| 2014/0270306 A1* | 9/2014 | Luna | H04R 3/00 381/334 |
| 2014/0308939 A1* | 10/2014 | Goldman | H04M 1/2535 455/417 |
| 2014/0376737 A1 | 12/2014 | Goldman | |
| 2015/0154559 A1* | 6/2015 | Barbush | G06Q 10/08355 705/338 |
| 2015/0189426 A1 | 7/2015 | Pang | |
| 2015/0327309 A1* | 11/2015 | Gardenfors | G08B 5/36 455/41.2 |
| 2016/0142874 A1* | 5/2016 | Jung | H04W 4/023 455/456.1 |

FOREIGN PATENT DOCUMENTS

| | | |
|---|---|---|
| CN | 103701986 A | 4/2014 |
| CN | 103813228 A | 5/2014 |
| CN | 104065827 A | 9/2014 |
| CN | 104065832 A | 9/2014 |
| CN | 104679716 A | 6/2015 |
| WO | 2008018918 A1 | 2/2008 |
| WO | 2013009319 A1 | 1/2013 |
| WO | 2013098262 A1 | 7/2013 |
| WO | 2014107467 A1 | 7/2014 |

* cited by examiner

DETERMINATION OF DEVICE AT WHICH TO PRESENT AUDIO OF TELEPHONIC COMMUNICATION

FIELD

The present application relates generally to determining a device at which to present audio of a telephonic communication.

BACKGROUND

Bluetooth-enabled devices often automatically connect to each other and can be jointly used for engaging in a telephonic communication. However, as understood herein, there are times when a user may be near one of the devices, such as a smart phone, while not being near another of the devices, such as a Bluetooth headset. Nonetheless, owing to the automatic connection of the smart phone to the headset, when a user attempts to engage in the telephonic communication using only the smart phone, the user may not hear anything at the smart phone because the audio for the telephonic communication is being presented at the Bluetooth headset, which may not be a conveniently accessible distance away from the user. There are currently no adequate solutions for addressing the foregoing.

SUMMARY

Accordingly, in one aspect a first device includes a processor, a Bluetooth transceiver accessible to the processor, and storage accessible to the processor. The storage bears instructions executable by the processor to, based on at least one signal received at the Bluetooth transceiver, determine a distance from the first device to a second device different from the first device. The instructions are also executable to, based on the distance, execute at least one function at the first device associated with a telephonic communication.

In another aspect, a method includes determining a distance at least between a first device and a second device and, based at least in part on the determining of the distance, determining at which of the first device and the second device to present at least audio.

In still another aspect, an apparatus includes a first processor, a network adapter, and storage hearing instructions executable by a second processor for determining at least one of at least two devices at which to present content based at least in part on a determination of a distance between the two devices. The first processor transfers the instructions over a network via the network adapter.

The details of present principles, both as to their structure and operation, can best be understood in reference to the accompanying drawings, in which like reference numerals refer to like parts, and in which:

DETAILED DESCRIPTION

Figure 1:
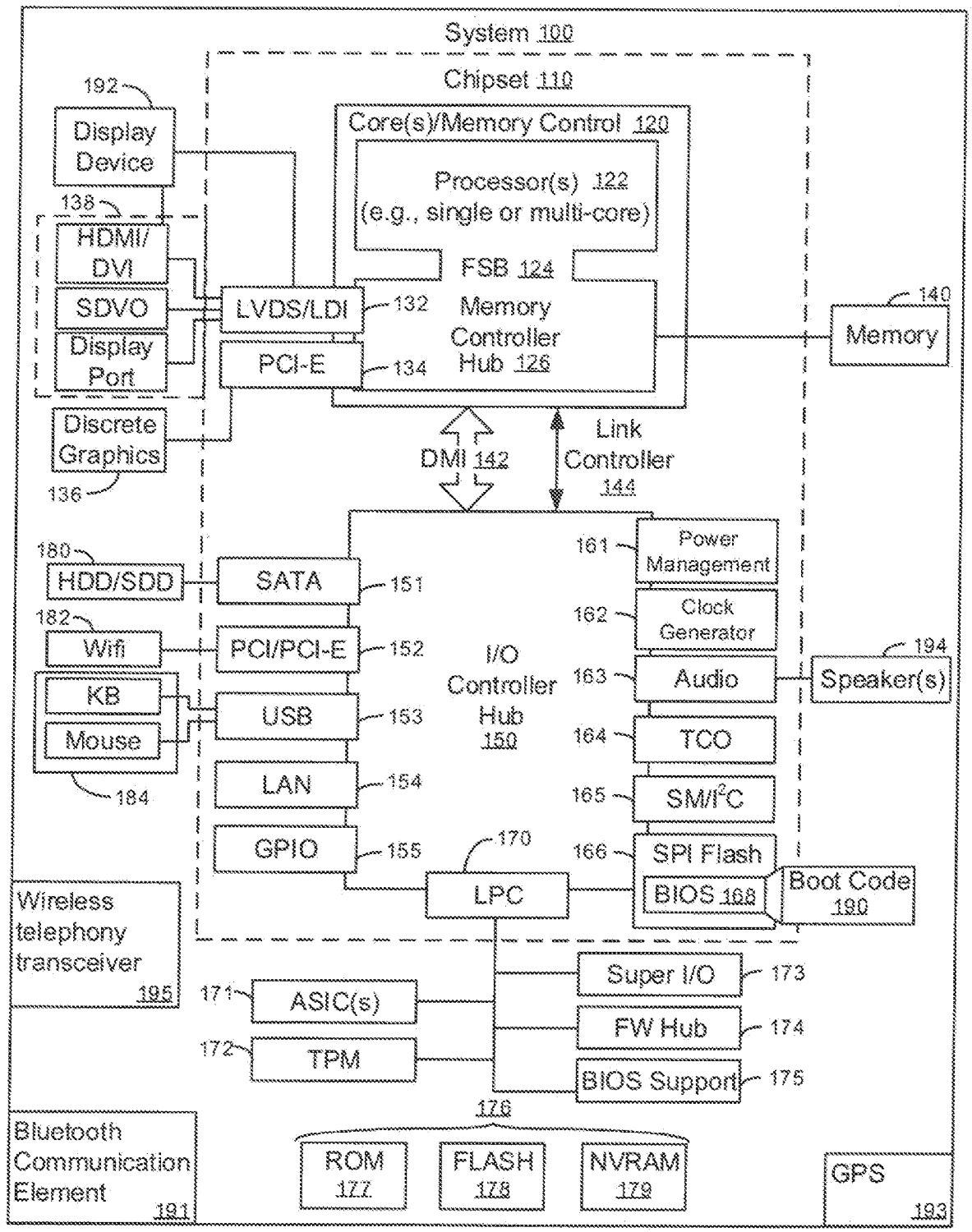
FIG. 1 is a block diagram of an example system in accordance with present principles.

This disclosure relates generally to device-based information. With respect to any computer systems discussed herein, a system may include server and client components, connected over a network such that data may be exchanged between the client and server components. The client components may include one or more computing devices including televisions (e.g., smart TVs, Internet-enabled TVs), computers such as desktops, laptops and tablet computers, so-called convertible devices (e.g., having a tablet configuration and laptop configuration), and other mobile devices including smart phones. These client devices may employ, as non-limiting examples, operating systems from Apple, Google, or Microsoft. A Unix or similar such as Linux operating system may be used. These operating systems can execute one or more browsers such as a browser made by Microsoft or Google or Mozilla or other browser program that can access web applications hosted by the Internet servers over a network such as the Internet, a local intranet, or a virtual private network.

As used herein, instructions refer to computer-implemented steps for processing information in the system. Instructions can be implemented in software, firmware or hardware; hence, illustrative components, blocks, modules, circuits, and steps are set forth in terms of their functionality.

A processor may be any conventional general purpose single- or multi-chip processor that can execute logic by means of various lines such as address lines, data lines, and control lines and registers and shift registers. Moreover, any logical blocks, modules, and circuits described herein can be implemented or performed, in addition to a general purpose processor, in or by a digital signal processor (DSP), a field programmable gate array (FPGA) or other programmable logic device such as an application specific integrated circuit (ASIC), discrete gate or transistor logic, discrete hardware components, or any combination thereof designed to perform the functions described herein. A processor can be implemented by a controller or state machine or a combination of computing devices.

Any software and/or applications described by way of flow charts and/or user interfaces herein can include various sub-routines, procedures, etc. It is to be understood that logic divulged as being executed by, e.g., a module can be redistributed to other software modules and/or combined together in a single module and/or made available in a shareable library.

Logic when implemented in software, can be written in an appropriate language such as bin not limited to C# or C++, and can be stored on or transmitted through a computer-readable storage medium (e.g., that may not be a transitory signal) such as a random access memory (RAM), read-only memory (ROM), electrically erasable programmable read-only memory (EEPROM), compact disk read-only memory (CD-ROM) or other optical disk storage such as digital versatile disc (DVD), magnetic disk storage or other magnetic storage devices including removable thumb drives, etc. A connection may establish a computer-readable medium. Such connections can include, as examples, hard-wired cables including fiber optics and coaxial wires and twisted pair wires. Such connections may include wireless communication connections including infrared and radio.

In an example, a processor can access information over its input lines from data storage, such as the computer readable storage medium, and/or the processor can access information wirelessly from an Internet server by activating a wireless transceiver to send and receive data. Data typically is converted from analog signals to digital by circuitry between the antenna and the registers of the processor when being received and from digital to analog when being transmitted. The processor then processes the data through its shift registers to output calculated data on output lines, for presentation of the calculated data on the device.

Components included in one embodiment can be used in other embodiments in any appropriate combination. For example, any of fee various components described herein and/or depicted in the Figures may be combined, interchanged or excluded from other embodiments.

"A system having at least one of A, B, and C" (likewise "a system having at least one of A, B, or C" and "a system having at least one of A, B, C") includes systems that have A alone, B alone, C alone, A and B together, A and C together, B and C together, and/or A, B, and C together, etc.

"A system having one or more of A, B, and C" (likewise "a system having one or more of A, B, or C" and "a system having one or more of A, B, C") includes systems that have A alone, B alone, C alone, A and B together, A and C together, B and C together, and/or A, B, and C together, etc.

The term "circuit" or "circuitry" is used in the summary, description, and/or claims. As is well known in the art, the term "circuitry" includes all levels of available integration, e.g., from discrete logic circuits to the highest level of circuit integration such as VLSI, and includes programmable logic components programmed to perform the functions of ail embodiment as well as general-purpose or special-purpose processors programmed with instructions to perform those functions.

Now specifically in reference to FIG. 1, it shows an example block diagram of an information handling system and/or computer system 100. Note that in some embodiments the system 100 may be a desktop computer system, such as one of the ThinkCentre® or ThinkPad® series of personal computers sold by Lenovo (US) Inc. of Morrisville, N.C., or a workstation computer, such as the ThinkStation®, which are sold by Lenovo (US) Inc. of Morrisville, N.C.; however, as apparent from the description herein, a client device, a server or other machine in accordance with present principles may include other features or only some of the features of the system 100. Also, the system 100 may be, e.g., a game console such as XBOX® or Playstation®.

As shown in FIG. 1, the system 100 includes a so-called chipset 110. A chipset refers to a group of integrated circuits, or chips, that are designed to work together. Chipsets are usually marketed as a single product (e.g., consider chipsets marketed under the brands INTEL®, AMD®, etc.).

In the example of FIG. 1, the chipset 110 has a particular architecture, which may vary to some extent depending on brand or manufacturer. The architecture of the chipset 110 includes a core and memory control group 120 and an I/O controller hub 150 that exchange information (e.g., data, signals, commands, etc.) via, for example, a direct management interface or direct media interface (DMI) 142 or a link controller 144. In the example of FIG. 1, the DMI 142 is a chip-to-chip interface (sometimes referred to as being a link between a "northbridge" and a "southbridge").

The core and memory control group 120 include one or more processors 122 (e.g., single core or multi-core, etc.) and a memory controller hub 126 that exchange information via a front side bus (FSB) 124. As described herein, various components of the core and memory control group 120 may be integrated onto a single processor die, for example, to make a chip that supplants the conventional "northbridge" style architecture.

The memory controller hub 126 interfaces with memory 140. For example, the memory controller hub 126 may provide support for DDR SDRAM memory (e.g., DDR, DDR2, DDR3, etc.). In general, the memory 140 is a type of random-access memory (RAM). It is often referred to as "system memory."

The memory controller hub 126 further includes a low-voltage differential signaling interface (LVDS) 132. The LVDS 132 may be a so-called LVDS Display Interface (LDI) for support of a display device 192 (e.g., a CRT, a flat panel, a projector, a touch-enabled display, etc.). A block 138 includes some examples of technologies that may be supported via the LVDS interface 132 (e.g., serial digital video, HDMI/QVL display port). The memory controller hub 126 also includes one or more PCI-express interfaces (PCI-E) 134, for example, tor support of discrete graphics 136. Discrete graphics using a PCI-E interface has become an alternative approach to an accelerated graphics port (AGP). For example, the memory controller hub 126 may include a 16-lane (x16) PCI-E port for an external PCI-E-based graphics card (including, e.g., one of more GPUs). An example system may include AGP or PCI-E for support of graphics.

The I/O hub controller 150 includes a variety of interfaces. The example of FIG. 1 includes a SATA interface 151, one or more PCI-E interfaces 152 (optionally one or more legacy PCI interfaces), one or more USB interfaces 153, a LAN interface 154 (more generally a network interface for communication over at least one network such as the Internet, a WAN, a LAN, etc. under direction of the processor(s) 122), a general purpose I/O interface (GPIO) 155, a low-pin count (LPC) interface 170, a power management interface 161, a clock generator interface 162, an audio interface 163 (e.g., for speakers 194 to output audio), a total cost of operation (TCO) interface 164, a system management bus interface (e.g., a multi-master serial computer bus interface) 165, and a serial peripheral flash memory/controller interface (SPI Flash) 166, which, in the example of FIG. 1, includes BIOS 168 and boot code 190. With respect to network connections, the I/O hub controller 150 may include integrated gigabit Ethernet controller lines multiplexed with a PCI-E interface port. Other network features may operate independent of a PCI-E interface.

The interfaces of the I/O hub controller 150 provide for communication with various devices, networks, etc. For example, the SATA interface 151 provides for reading, writing or reading and writing information on one or more drives 180 such as HDDs, SDDs or a combination thereof, but in any case the drives 180 are understood to be, e.g., tangible computer readable storage mediums that may not be transitory signals. The I/O hub controller 150 may also include an advanced host controller interface (AHCI) to support one or more drives 180. The PCI-E interface 152 allows for wireless connections 182 to devices, networks, etc. The USB interface 153 provides for input devices 184 such as keyboards (KB), mice and various other devices (e.g., cameras, phones, storage, media players, etc.).

In the example of FIG. 1, the LPC interface 170 provides for use of one or more ASICs 171, a trusted platform module (TPM) 172, a super I/O 173, a firmware hub 174, BIOS support 175 as well as various types of memory 176 such as ROM 177, Flash 178, and non-volatile RAM (NVRAM) 179. With respect to the TPM 172, this module may be in the form of a chip that can be used to authenticate software and hardware devices. For example, a TPM may be capable of performing platform authentication and may be used to verify that a system seeking access is the expected system.

The system 100, upon power on, may be configured to execute boot code 190 for the BIOS 168, as stored within the SPI Flash 166, and thereafter processes data under the control of one or more operating systems and application software (e.g., stored in system memory 140). An operating system may be stored in any of a variety of locations and accessed, for example, according to instructions of the BIOS 168.

Furthermore, the system 100 may include a Bluetooth and/or Bluetooth low energy (BLE) communication element 191 (e.g., a Bluetooth 4.0 communication element) for communicating with other devices (such as the wearable device 206 to be described below in reference to FIG. 2) using Bluetooth communication protocols, and a GPS receiver 193 that is configured to receive geographic position information from at least one satellite and provide the information to the processor 122. However, it is to be understood that another suitable position receiver other than a GPS receiver may be used in accordance with present principles to determine the location of the system 100. Further still, the system 100 may include a wireless telephony transceiver 195 for engaging in a telephonic communication at the system 100 over a wireless telephone network.

Additionally, though now shown for clarity, in some embodiments the system 100 may include a gyroscope for sensing and/or measuring the orientation of the system 100 and providing input related thereto to the processor 122, an accelerometer for sensing acceleration and/or movement of the system 100 and pro viding input related thereto to the processor 122, an audio receiver/microphone providing input to the processor 122 based on, e.g., a user providing audible input to the microphone, and a camera for gathering one or more images and providing input related thereto to the processor 122. The camera may be a thermal imaging camera, a digital camera such as a webcam, a three-dimensional (3D) camera, and/or a camera otherwise integrated into the system 100 and controllable by the processor 122 to gather pictures/images and/or video.

Figure 2:
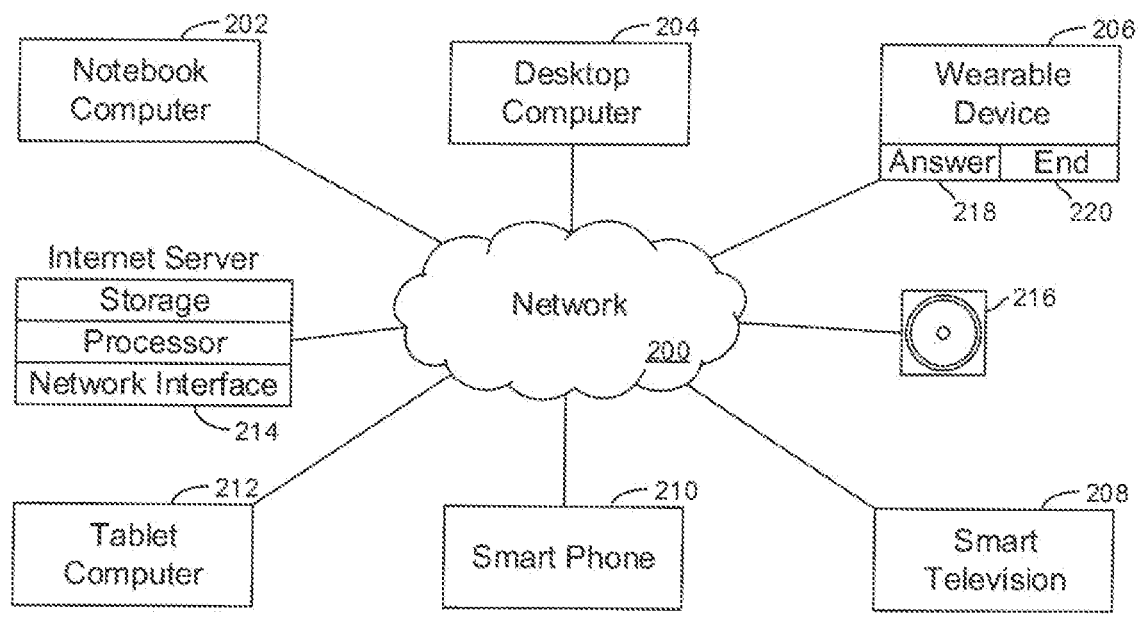
FIG. 2 is a block diagram of a network of devices in accordance with present principles.

Before moving on to FIG. 2, it is to be understood that an example client device or other machine/computer may include fewer or more features than shown on the system 100 of FIG. 1. In any case, it is to be understood at least based on the foregoing that the system 100 is configured to undertake present principles.

Turning now to FIG. 2, it shows example devices communicating over a network 200 such as the Internet in accordance with present principles. It is to be understood that each of the devices described in reference to FIG. 2 may include at least some of the features, components, and/or elements of the system 100 described above. In any case, FIG. 2 shows a notebook computer 202, a desktop computer 204, a wearable device 206, a smart television (TV) 208, a smart phone 210, a tablet computer 212, a bluetooth-communication-enabled speaker 216, and a server 214 such as an Internet server that may provide cloud storage accessible to the devices 202-212 and 216. It is to be understood that the devices 202-216 are configured to communicate with each other over the network 200 to undertake present principles, such as by communicating via Bluetooth communication, WiFi communication, etc.

Describing the wearable device 206 in more detail, in some example embodiments it may be a Bluetooth headset which engages with a person's ear, has at least one speaker for providing audio to the person's ear at least when worn, has at least one microphone for receiving audio spoken by the person at least when worn, and has a Bluetooth communication element for communicating via Bluetooth communication with another device such as a smart phone which itself has a wireless telephony transceiver for facilitating a telephonic communication using one or both of the smart phone and the wearable device 206. As shown in FIG. 2, the wearable device 206 may also include an answer button and/or element 218 which is manipulate to answer an incoming telephone call using the wearable device 206 (incoming to the device 206 and/or a device comprising a wireless telephony transceiver that is in communication with the device 206 via Bluetooth communication, such as a smart phone and/or the system 100), as well as a decline/end button and/or element 220 which is manipulate to decline to answer the incoming call and/or end a telephonic communication being conducted at least partially using the wearable device 206.

Figure 3:
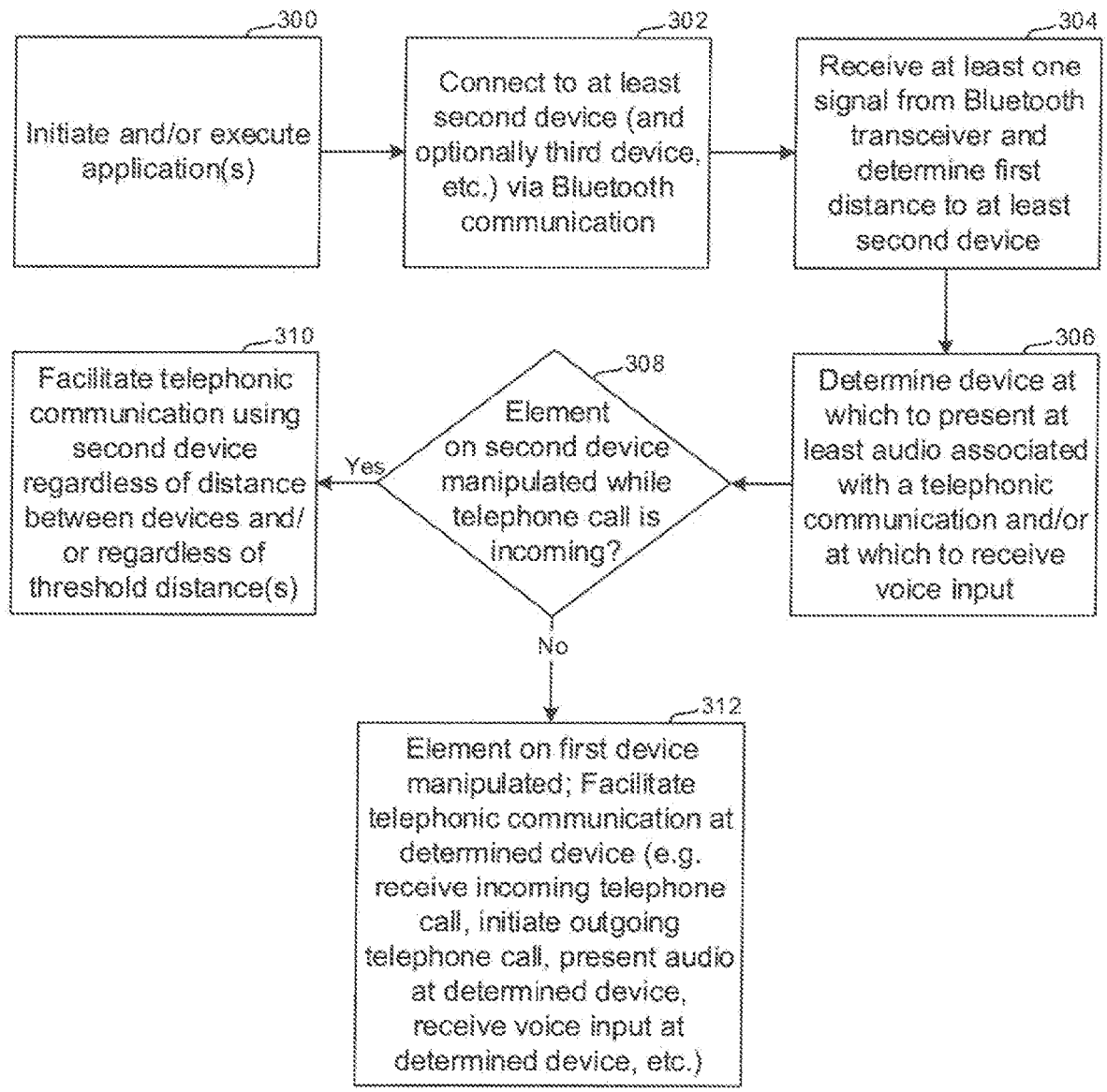
FIGS. 3 and 4 are flow charts showing example algorithms in accordance with present principles.

Referring to FIG. 3, it shows example logic that may be undertaken by a first device in accordance with present principles, such as the system 100. Beginning at block 300, the logic initiates and/or executes one or more applications for undertaking present principles, such as a telephone application, a Bluetooth communication application, a position and/or distance determination application, etc. The logic then moves to block 302 where the logic connects the first device to at least a second device (and optionally still other devices such as a third device) using Bluetooth communication. The logic then proceeds to block 304, at which the logic receives at least one signal and/or data from a Bluetooth transceiver on the first device which receives Bluetooth signals from the second device. Also at block 304, the logic determines based on the signal and/or data the distance from the first device to the second device and the distance(s) to any other devices to which the first device connected at block 302.

Distance may be determined at block 304 using received signal strength indicator (RSSI) principles for Bluetooth communication to determine the distance to the other device based on the strength of Bluetooth signals transmitted by the other device and received at the first device. The distance may also be determined, in addition to or in lieu of using Bluetooth communication, using still other methods such as, e.g., using Wi-Fi communication between the first device and the second device in which location information is exchanged, using network information, using GPS coordinates received from a GPS transceiver on the first device and GPS coordinates received from the second device to determine the distance between the first device and the second device based on the GPS coordinates, using a rangefinder (e.g., a laser rangefinder, a sonar rangefinder, etc.) on the first device and camera on the first device to identify the second device based on images from the camera and execution of object recognition and then determine the distance thereto by controlling the rangefinder, etc.

Still in reference to FIG. 3, from block 304 the logic proceeds to block 306. At block 306 the logic determines a device of the first device, the second device, and any other devices to which the first device connected at block 302 at which to present and/or to which to transmit at least audio associated with a telephonic communication, and/or at which to receive and/or from which to receive voice input from the user when engaging in the telephonic communication. The determination at block 306 will be described further below in reference to FIG. 4.

Regardless, alter block 306 the logic then moves to decision diamond 308. At diamond 308 the logic determines whether an element on the second device has been manipulated while a telephonic communication is incoming, such as whether an answer depressable button or an answer touch-enabled selector on a Bluetooth headset in communication with the first device has been selected. Responsive to an affirmative determination at diamond 308, the logic proceeds to block 310 and facilitates the telephonic communication using the second device regardless of the distance between the first device and the second device, and/or regardless of any threshold distances) in accordance with present principles (which will be described further below). Accordingly, so long as the first device and the second device are communicating via Bluetooth communication and the answer element on the second device is selected, the telephonic communication may be facilitated using the second device regardless of the distance between it and the first device.

However, responsive to a negative determination at diamond 308, the logic instead moves from diamond 308 to block 312. Initially, note that at block 312 the logic may receive input to the first device and determine that the first device is being manipulated to facilitate the telephonic communication at least in part using the first device (e.g., is being manipulated to answer an incoming telephone call or to place an outgoing telephone call). Also at block 312 (and in some embodiments, responsive to the manipulation of the first device to facilitate the telephonic communication), the logic facilitates a telephonic communication at least partially at the device determined at block 306 to be a device at which to present at least audio associated with the telephonic communication and/or at which to receive voice input. Nonetheless, it is to be understood that at block 312 the logic facilitates the telephonic communication at least at the first device as well, be it only at the first device if the first device was determined to be the device at which to present at least audio associated with the telephonic communication and/or at which to receive voice input, and/or at both of the first device and the second device (e.g., conducting the telephonic communication at the first device using a wireless telephony transceiver thereon, and forwarding and receiving data via Bluetooth communication from the second device so that a user may participate in the telephonic communication by listening to it at the second device and providing voice input at the second device) if the second device was determined to be the device at which to present at least audio associated with the telephonic communication and/or at which to receive voice input.

Figure 4:
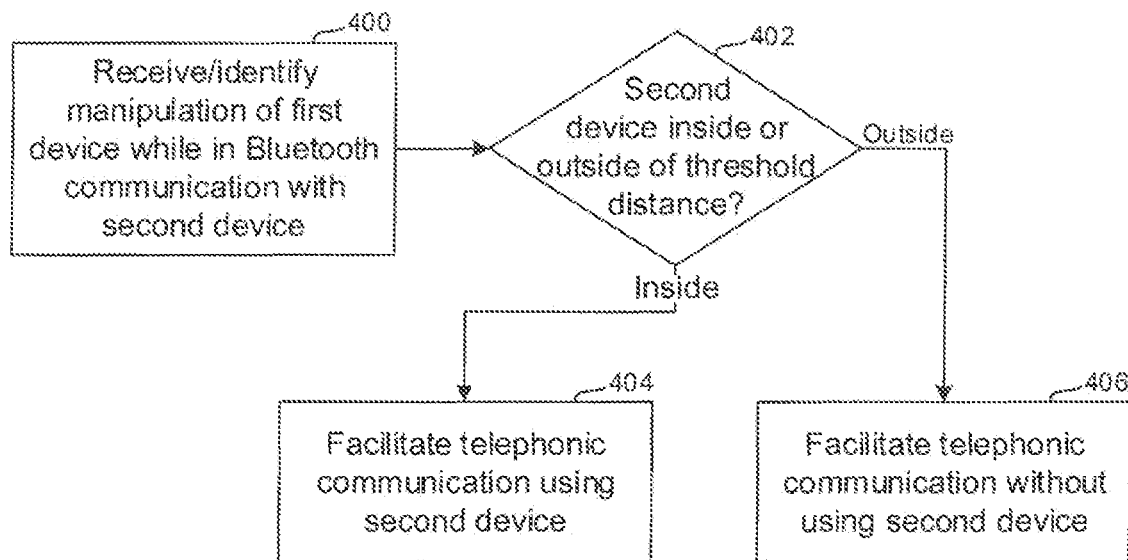

Continuing the detailed description in reference to FIG. 4, it shows example logic that may be undertaken by the first device described above in reference to FIG. 3 to determine at which of at least the first device and the second device described above to present at least audio associated with a telephonic communication and/or at which to receive voice input from the user when engaging in the telephonic communication. Accordingly, it is to be understood that the logic of FIG. 4 may be executed by the first device in conjunction with the logic of FIG. 3.

In any case, the logic of FIG. 4 begins at block 400. At block 400 the logic receives data pertaining to and/or identifies manipulation of the first device (e.g., such as input to answer a telephone call or to place a telephone call) while the first device is in Bluetooth communication with the second device. The logic then proceeds to decision diamond 402, where the logic determines whether the second device is inside or outside of a threshold distance (e.g., established by a user) to the first device (e.g., based on RSSI principles, using GPS coordinates, etc.). A determination at diamond 402 that the second device is inside of the threshold distance causes the logic to move from diamond 402 to block 404 and responsive to this determination the logic at block 404 facilitates the telephonic communication using the second device. However, a determination at diamond 402 that the second device is outside of the threshold distance causes the logic to move from diamond 402 to block 406 and responsive to this determination the logic at block 406 facilitates the telephonic communication without using the second device (e.g., even if the logic determines to facilitate the telephonic communication using another device in addition to the first device).

Figure 5:
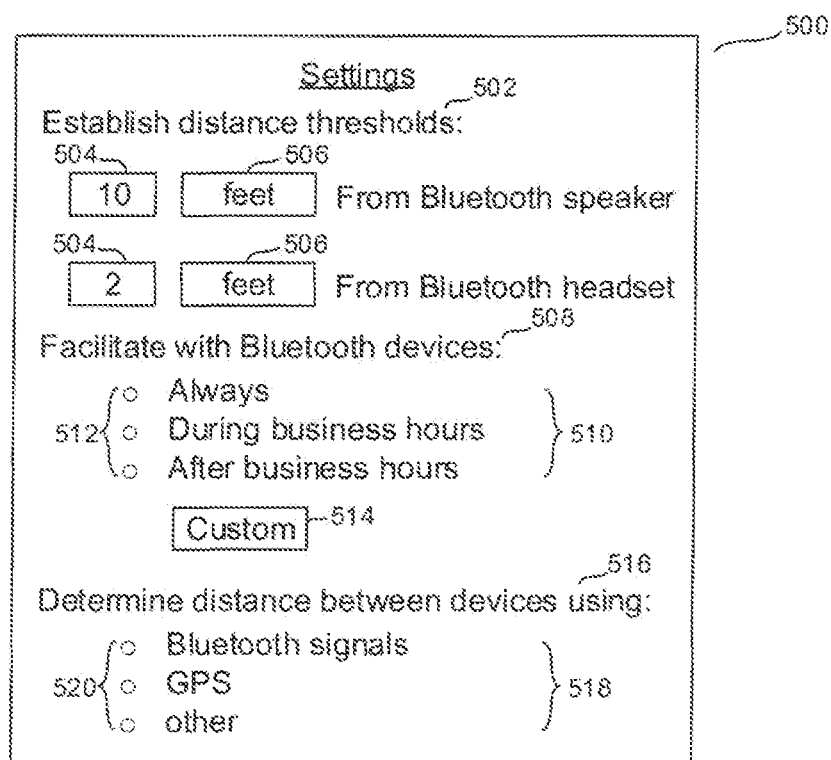
FIG. 5 is an example user interface (UI) in accordance with present principles.

Continuing the detailed description now in reference to FIG. 5, it shows an example user interface (UI) 500 presentable on a display of a device such as the system 100 and/or a device undertaking present principles (e.g., the first device described above in reference to FIGS. 3 and 4). The UI 500 is understood to present plural settings for configuring the device in accordance with present principles. Thus, the UI 500 includes a first setting 502 for establishing one or more distance thresholds for respective Bluetooth-communication-enabled devices for undertaking the determinations described herein, such as the determination made at diamond 402 as described above.

As may be appreciated from example FIG. 5, two areas are shown for respectively configuring distance thresholds for two different Bluetooth-enabled devices that have been configured for Bluetooth communication (e.g., have been "paired") with the device presenting the UI 500. In the example shown, both a Bluetooth speaker and a Bluetooth headset have been paired with the device, and accordingly respective number entry/selection boxes 504 and respective increment entry/selection boxes 506 are shown for each of them for respectively entering/selecting numbers and corresponding length increments for establishing the distance thresholds for each of them.

The UI 500 also includes a second setting 508 for optionally establishing one or more times at which the device presenting the UI 500 may facilitate telephonic communication using another Bluetooth-communication-enabled device, such as the Bluetooth speakers and Bluetooth headsets discussed herein, based on distance and/or distance thresholds as also discussed herein. Each respective option 510 shown tor the setting 508 has a corresponding radio button 512 adjacent thereto that is selectable to enable the device to facilitate telephonic communication using another Bluetooth-communication-enabled device based on the corresponding time associated with the respective option and/or radio button. As may be appreciated from FIG. 5, these options include an always option in which the device facilitates such telephonic communications at all times, a business hours option in which the device facilitates such telephonic communications during business hours only (e.g., Monday through Friday, 9:00 a.m. to 5:00 p.m. local time), and an option for other than business hours only (e.g., all other times except for Monday through Friday, 9:00 a.m. to 5:00 p.m. local time). Also note that the setting 508 includes a custom selector 514 for establishing one or more custom and/or user-defined times and/or lime ranges at which the device facilitates such telephonic communications.

Still in reference to FIG. 5, the UI 500 further includes a setting 516 for configuring the device to use one or more methods for determining distance and/or location of the device presenting the UI 500 and other Bluetooth-communication-enabled devices paired with the device presenting the UI 500 for undertaking present principles. Thus, plural options 518 are shown, which include determining distance and/or location using Bluetooth signals (e.g., using RSSI), determining distance and/or location using GPS coordinates, and an "other" option for determining distance and/or location still other ways in which the device is configured to determine distance and/or location. Note that each respective option 518 has a radio button 520 adjacent thereto for selection to enable the device to use the respective option to determine distance and/or location.

Figure 6:
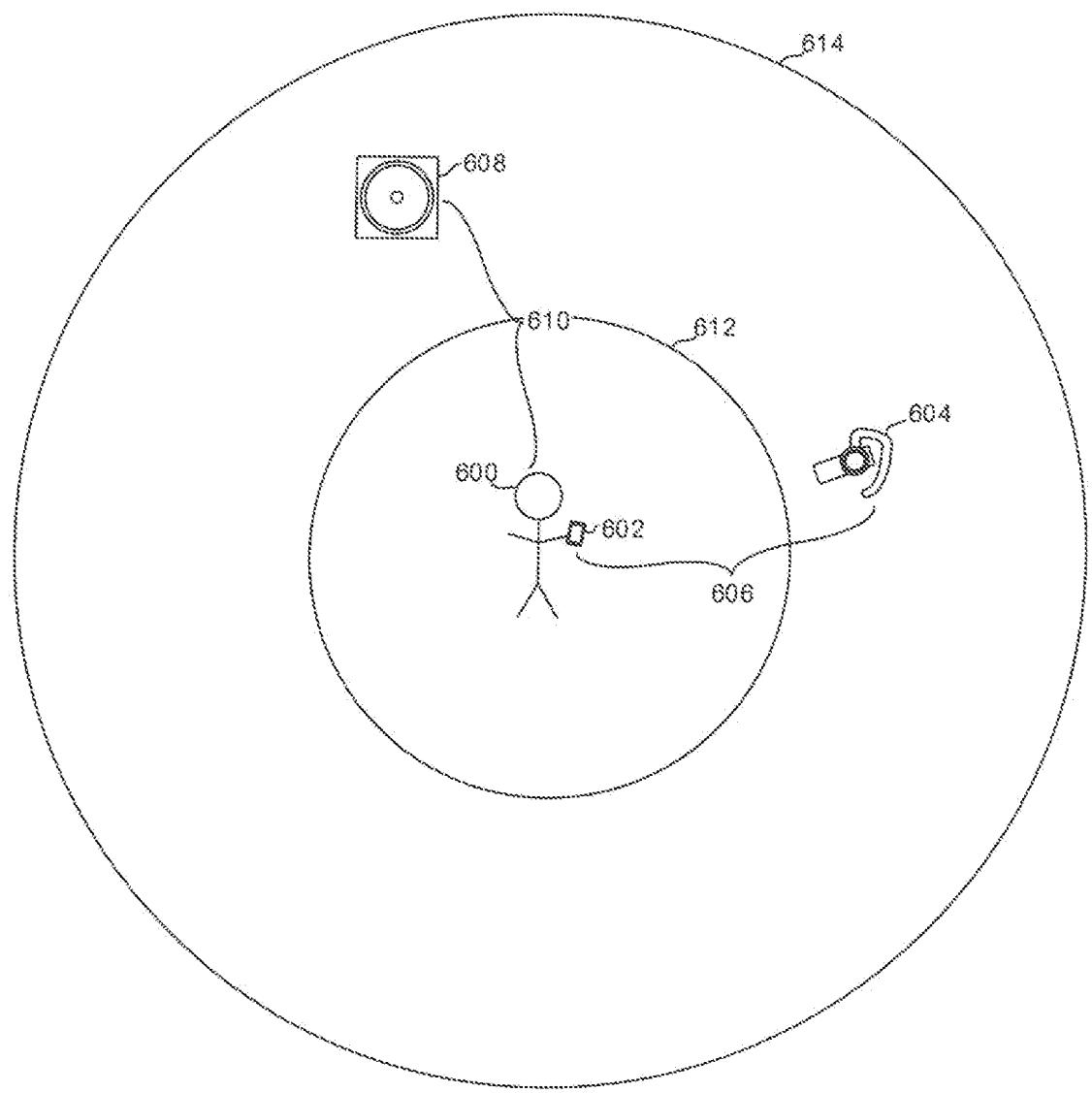
FIG. 6 is an example illustration in accordance with present principles.

Reference is now made to FIG. 6, which shows an example illustration of present principles. A user 600 having a device 602 is shown, along with a Bluetooth headset 604 a first distance 606 away mom the device 602 and s Bluetooth speaker 608 a second distance 610 away from the device 602. Note that FIG. 6 also shows a first distance threshold 612 for the headset 604 represented in this illustration as a radius around the device 602, and a second distance threshold 614 for the speaker 608 represented in this illustration as another radius around the device 602.

As may be appreciated from FIG. 6, the headset 604 is outside of its respective distance threshold to the device 602 and, accordingly, should an incoming telephone call be received at the device 602 and the user manipulate the device 602 to answer the telephone call, the device 602 will determine to not use the headset 604 for presenting audio associated with the telephone call because the headset 604 is outside of its respective distance threshold to the device 602. However, also note that the device 602 will determine to use the speaker 608 for presenting audio associated with the telephone call when the user manipulates the device because the speaker 608 is inside of its respective distance threshold to the device 602.

It is to be understood that present principles are not limited to telephonic communications (e.g., wireless telephone network communications, VoIP communications, etc.) but may also apply to other situations, such as presenting music at one device or another based on distance as disclosed herein. For example, a device may determine a distance to Bluetooth speaker in a vehicle and then responsive to receipt of a user request (received at the device) to play music stored on the device, the device may determine whether the Bluetooth speaker is inside or outside of a threshold distance to the device and determine whether to present the music at the device or forward/transmit (via Bluetooth communication) the requested music to the Bluetooth speaker for presentation of the music using the Bluetooth speaker.

Even further, in some embodiments distance thresholds in accordance with present principles may be associated with and/or based on audio type, in addition to or in lieu of being based on particular devices or device types. For instance, a first distance threshold may be used for instances involving telephonic communications, and a second distance threshold different from the first distance threshold may be used for instances involving other types of audio such as music, podcasts, audio of an online video, audio for applications other than telephone applications (e.g., audio associated with a gaining application), etc.

It is to also be understood that the threshold distances described herein may be less than respective maximum distances between two devices at which Bluetooth signals may be effectively communicated (e.g., directly therebetween). Even further, it is to also be understood that present principles apply in situations where the devices are using another method of communication other than Bluetooth communication, such as e.g. Wi-Fi direct communication It may now be appreciated that present principles provide for using, e.g., Bluetooth 4.0 to determine how far away a Bluetooth headset or receiver is from a phone device. The phone device may then determine at which device to answer a phone call or present audio when connected to another device via Bluetooth communication. If the devices are close together (e.g., within a threshold distance) and the user answers a call by manipulating the phone device, the call may be automatically taken on the connected Bluetooth device (e.g., headset). However, if the devices are further apart (e.g., outside of the threshold distance), for example 15 feet, and the user hits the answer button on the phone device, then the call will be answered on the phone device and the headset will not be used to facilitate the telephone call. Notwithstanding, in some embodiments if the user hits the answer button on the Bluetooth headset, the default action may be to transmit the audio to the Bluetooth headset and/or present it thereon.

Further still, it is to be understood that in some embodiments, the user may be permitted to set the distance threshold(s), including thresholds at which the phone device may switch facilitation of the phone call from a Bluetooth speaker back to the phone device and vice versa as distance changes in real time between the phone device and the Bluetooth speaker. For example, the user may configure the phone device so that if the user is walking away from the Bluetooth speaker with their phone device while also engaging in a telephonic communication, the phone device switches presentation of audio from Bluetooth speaker to the phone device at the threshold of ten feet.

Before concluding, it is to be understood that although a software application for undertaking present principles may be vended with a device such as the system 100, present principles apply in instances where such an application is downloaded from a server to a device over a network such as the Internet. Furthermore, present principles apply in instances where such an application is included on a computer readable storage medium that is being vended and/or provided, where the computer readable storage medium is not a transitory signal and/or a signal per se.

While the particular DETERMINATION OF DEVICE AT WHICH TO PRESENT AUDIO OF TELEPHONIC COMMUNICATION is herein shown and described in detail, it is to be understood that the subject matter which is encompassed by the present application is limited only by the claims.

What is claimed is:

1. A first device, comprising:
   at least one processor;
   a Bluetooth transceiver accessible to the at least one processor; and
   storage accessible to the at least one processor and bearing instructions executable by the at least one processor to:
   based on at least one signal received at the Bluetooth transceiver, determine a distance from the first device to a second device different from the first device,
   based on at least one signals received by the first device, identify a device type of the second device; and
   execute at the first device at least one function associated with a telephonic communication, wherein the determination of distance is undertaken at least in part by:
   comparing the distance to a first distance threshold responsive to identifying that the second device is a device of a first device type;
   comparing the distance to a second distance threshold different from the first distance threshold responsive to identifying that the second device is a device of a second device type, the first device type being different from the second device type.

2. The first device of claim 1, wherein the first and second distance thresholds are established by a user based at least in part on input received via a graphical user interface (GUI) presented on a display.

3. The first device of claim 1, wherein the instructions are executable to:
regardless of the distance and in response to actuation of an element on the second device, present at least audio associated with the telephonic communication at the second device.

4. The first device of claim 1, wherein the first device comprises a wireless telephony transceiver, and wherein the function is associated with facilitation of the telephonic communication at least in part using the wireless telephony transceiver.

5. The first device of claim 1, wherein the telephonic communication is an incoming telephonic communication, and wherein the instructions are executable to:
based at least in part on the determination of the distance and in response to manipulation of the first device to answer the incoming telephonic communication, execute the at least one function.

6. The first device of claim 1, wherein first device type is headset, and wherein the second device type is a speaker.

7. The first device of claim 1, wherein first device type is a headset, and wherein the second device type is a television.

8. The first device of claim 1, wherein first device type is a wearable device, and wherein the second device type is a non-wearable device.

9. The first device of claim 1, wherein the first distance threshold is different from the second distance threshold.

10. The first device of claim 1, wherein the function comprises transmitting audio of the telephonic communication to the second device based on the distance being less than one or more of the first distance threshold and the second distance threshold, and wherein the function comprises presenting audio of the telephonic communication at the first device based on the distance being more than one or more of the first distance threshold and the second distance threshold.

11. A method, comprising:
determining a distance at least between a first device and a second device; and
based at least in part on the determining of the distance, determining at which of the first device and the second device to present at least audio;
wherein the determining is performed at least in part by:
identifying the second device;
comparing the distance to a first distance threshold based on identifying the second device as being a wearable device;
comparing the distance to a second distance threshold different from the first distance threshold based on identifying the second device as being something other than a wearable device.

12. The method of claim 11, wherein the determining of the distance at least between the first device and the second device is based at least in part on data from a Bluetooth communication element on the first device.

13. The method of claim 11, comprising:
in response to determining to present the at least audio at the first device, presenting the at least audio at the first device; and
in response to determining to present the at least audio at the second device, presenting the at least audio at the second device.

14. The method of claim 11, wherein the first distance threshold is used for the comparison based on the second device being a headset.

15. The method of claim 11, wherein the second distance threshold is used for the comparison based on the second device being a Bluetooth speaker.

16. The method of claim 11, wherein the second distance threshold is used for the comparison based on the second device being a television.

17. The method of claim 11, wherein the first distance threshold is different from the second distance threshold.

18. The method of claim 11, comprising:
receiving user input to a graphical user interface (GUI) to establish the first and second distance thresholds, the GUI presented on a display.

19. An apparatus, comprising:
a first processor;
a network adapter; and
storage bearing instructions executable by a second processor for:
determining a distance between a first device and a second device; and
based at least in part on the determining of the distance, determining at which of the first device and the second device to present at least audio;
wherein the determining is performed at least in part by:
identifying the second device,
comparing the distance to a first distance threshold based on identifying the second device as being a wearable device;
comparing the distance to a second distance threshold different from the first distance threshold based on identifying the second device as being something other than a wearable device.

20. The apparatus of claim 19, wherein the instructions are executable for:
receiving user input to a graphical user interface (GUI) to establish the first and second distance thresholds, the GUI presented on a display.

* * * * *